(12) United States Patent
Smith et al.

(10) Patent No.: US 9,765,890 B2
(45) Date of Patent: Sep. 19, 2017

(54) SHIFT RAIL ROD SEAL WITH POSITIONING FEATURE

(71) Applicant: Eaton Corporation, Cleveland, OH (US)

(72) Inventors: Timothy Smith, Mattawan, MI (US); Graeme Jackson, Kalamazoo, MI (US); Charles Ganske, Augusta, MI (US)

(73) Assignee: Eaton Corporation, Cleveland, OH (US)

( * ) Notice: Subject to any disclaimer, the term of this patent is extended or adjusted under 35 U.S.C. 154(b) by 721 days.

(21) Appl. No.: 14/316,914

(22) Filed: Jun. 27, 2014

(65) Prior Publication Data

US 2015/0001035 A1 Jan. 1, 2015

Related U.S. Application Data

(60) Provisional application No. 61/839,886, filed on Jun. 27, 2013.

(51) Int. Cl.
| | |
|---|---|
| *F15B 15/14* | (2006.01) |
| *F16J 15/3204* | (2016.01) |
| *F16J 15/3276* | (2016.01) |
| *F16D 125/08* | (2012.01) |

(52) U.S. Cl.
CPC ....... *F16J 15/3204* (2013.01); *F16J 15/3276* (2013.01); *F16D 2125/08* (2013.01)

(58) Field of Classification Search
CPC .............. F15B 15/1442; F15B 15/1461; F16D 2125/08

USPC ................................................ 92/165 R, 168
See application file for complete search history.

(56) References Cited

U.S. PATENT DOCUMENTS

| | | | | |
|---|---|---|---|---|
| 3,306,683 | A | 2/1967 | Deuring | |
| 3,596,534 | A * | 8/1971 | Logan | B60K 17/344 192/48.607 |
| 4,108,447 | A * | 8/1978 | Scholin | F16J 15/3268 277/553 |
| 6,450,051 | B1 * | 9/2002 | Balamuki | F16H 63/3023 74/335 |
| 8,042,422 | B2 | 10/2011 | Meyer | |
| 8,127,902 | B2 * | 3/2012 | Pasino | F16F 9/36 188/322.16 |
| 8,453,557 | B2 * | 6/2013 | Wilton | F15B 15/1409 92/165 R |
| 2010/0229668 | A1 * | 9/2010 | Smith | F16H 3/006 74/473.1 |

* cited by examiner

*Primary Examiner* — Thomas E Lazo
(74) *Attorney, Agent, or Firm* — RMCK Law Group, PLC

(57) ABSTRACT

A shift rail rod seal for a transmission shift apparatus. The rod seal includes a case that is over-molded with a seal body that includes a seal lip for engaging a shift rail and a chamfered lip that engages the seal bore chamfered bore entrance when the rod seal is correctly assembled into the seal housing bore. A transmission shift apparatus that is adapted to receive the shift rod seal includes a manifold housing and a clutch housing that together form a sealed cavity. A shift rail and piston are received in the sealed cavity that is pressurized to actuate the shift apparatus.

15 Claims, 2 Drawing Sheets

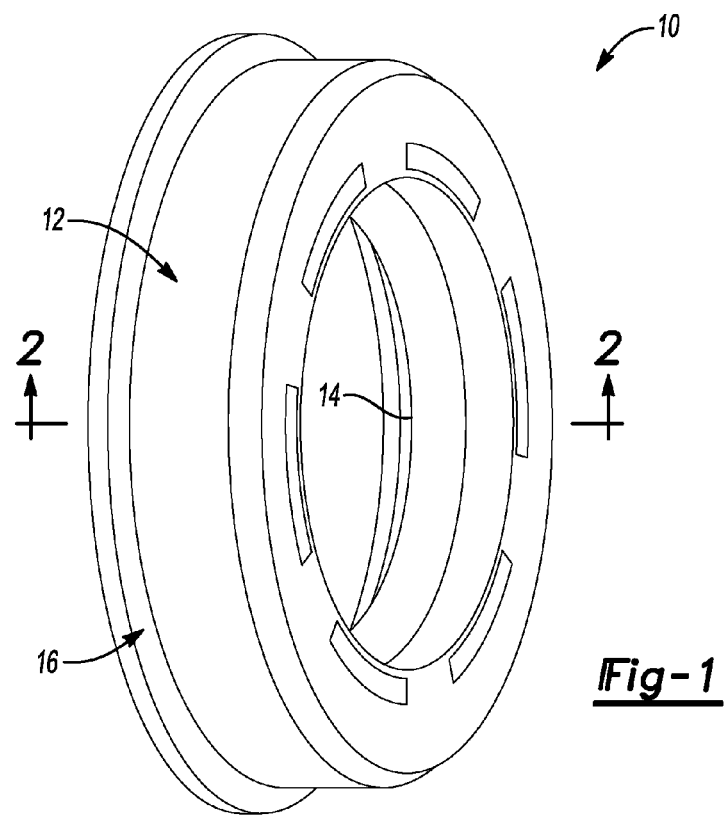
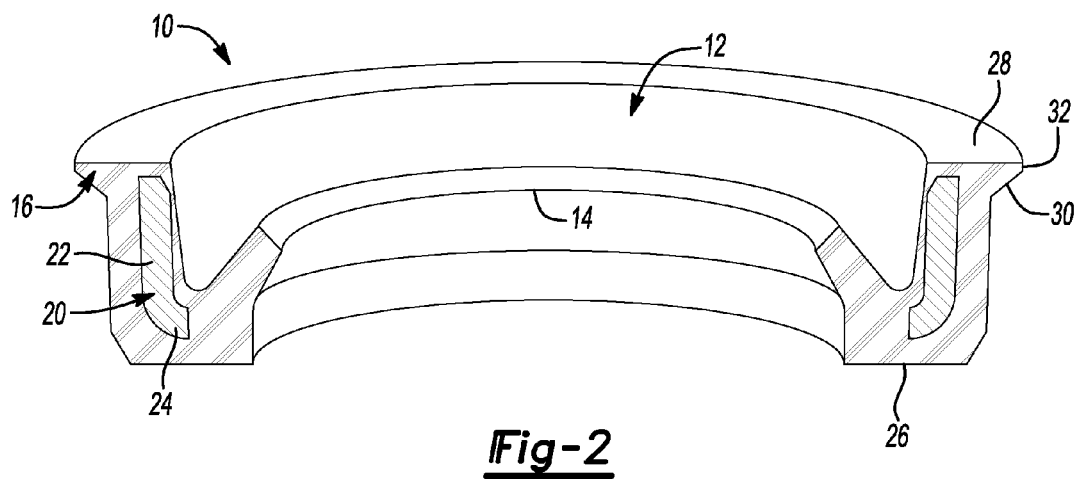

SHIFT RAIL ROD SEAL WITH POSITIONING FEATURE

CROSS-REFERENCE TO RELATED APPLICATIONS

This application claims the benefit of U.S. provisional application Ser. No. 61/839,886 filed Jun. 27, 2014, the disclosure of which is hereby incorporated in its entirety by reference herein.

TECHNICAL FIELD

This disclosure relates to a shift rail seat for a transmission shift mechanism that is configured to prevent improper installation of the seal.

BACKGROUND

Hydraulically actuated transmissions have sealed cavities for actuating the shift mechanism. Rod seals are provided that engage longitudinally shifted shift rails to maintain the hydraulic pressure within the sealed cavities. The rod seals are received within a bore and have a seal lip that engages the shift rail. Prior rod seals included a seal case that had a cylindrical outer surface that could be properly installed in the housing bore with the end face of the seal case engaging the end wall of the housing bore or improperly installed with the end face of the seal facing away from the housing bore. If the rod seal is improperly installed, an insufficient hydraulic seal is provided by the seal lip and hydraulic pressure within the sealed cavities is reduced.

This disclosure is directed resolving the above problem and other problems as summarized below.

SUMMARY

According to one aspect of this disclosure, a rod seal is assembled within a seal housing bore that has a chamfered bore entrance for receiving a shift rail of a transmission shift apparatus. The rod seal comprises a rigid cylindrical case and a seal body disposed between the case and rod seal housing. A seal lip extends from the seal body and is adapted to engage the shift rail. A chamfered lip is provided on the seal body that engages the chamfered bore entrance when the rod seal is correctly assembled into the seal housing bore.

According to other aspects of this disclosure, the seal body, seal lip and chamfered lip may be over-molded onto the case. The chamfered lip may include a beveled portion that extends from the seal body to a cylindrical outer peripheral portion that has a larger diameter than the seal body. The seal body may encase an outer cylindrical surface of the case and an inner cylindrical surface of the case. The seal housing bore may have a radially extending seal seating surface inset from the chamfered bore entrance. The seal body may be configured to engage the seal seating surface when the chamfered lip engages the chamfered bore entrance.

According to another aspect of this disclosure, a transmission shift apparatus is provided that comprises a manifold housing and a clutch housing that defines a sealed cavity in conjunction with the manifold housing. At least one of the housings defines a seal bore having a chamfered bore entrance. A rod extends through the manifold housing, the clutch housing and the sealed cavity. A seal is assembled within each of the seal bores that has a chamfered lip engaging the chamfered bore entrance with the seal engaging the rod.

According to another aspect of this disclosure, a transmission shift apparatus is provided that comprises a manifold housing defining a manifold housing bore having a first cylindrical wall and a first chamfered wall. A clutch housing is assembled to the manifold housing to define a sealed cavity. The clutch housing defines a clutch housing bore having a second cylindrical wall and a second chamfered wall. A manifold housing seal has a first cylindrical outer surface and a first chamfered outer surface that are adapted to be received in the manifold housing bore. A clutch housing seal has a second cylindrical outer surface and a second chamfered outer surface that are adapted to be received in the clutch housing bore. A shift rail extends through the manifold housing, the clutch housing and the sealed cavity. A shift piston is attached to the shift rail and is disposed within the sealed cavity to be shifted between the manifold housing seal and the clutch housing seal by hydraulic pressure. A manifold rod seal is disposed within the manifold housing bore with the first chamfered outer surface engaging the first chamfered wall. A clutch rod seal is disposed within the clutch housing bore with the second chamfered outer surface engaging the second chamfered wall.

According to other aspects of this disclosure as it relates to the transmission shift apparatus, the manifold rod seal and the clutch rod seal may each further comprise a seal body and a seal lip that are over-molded onto a seal case. Each seal body may encase an outer cylindrical surface of the case and an inner cylindrical surface of the case. Each chamfered outer surface may include a beveled portion that extends from a cylindrical body portion to a cylindrical outer peripheral portion that has a larger diameter than the cylindrical body portion. The manifold housing bore may have a first seal seating surface inset from the first chamfered wall that is engaged by the first seal seating surface when the first chamfered lip engages the first chamfered surface. The clutch housing bore may have a second seal seating surface inset from the second chamfered wall that is engaged by the second seal seating surface when the second chamfered lip engages the second chamfered surface.

The above aspects of this disclosure and other aspects of this disclosure are described below in greater detail with reference to the attached drawings.

BRIEF DESCRIPTION OF THE DRAWINGS

FIG. 1 is a perspective view of a shift rail rod seal made according to one embodiment of this disclosure;

FIG. 2 is a cross-section view taken along the line 2-2 in FIG. 1;

DETAILED DESCRIPTION

Figure 3:
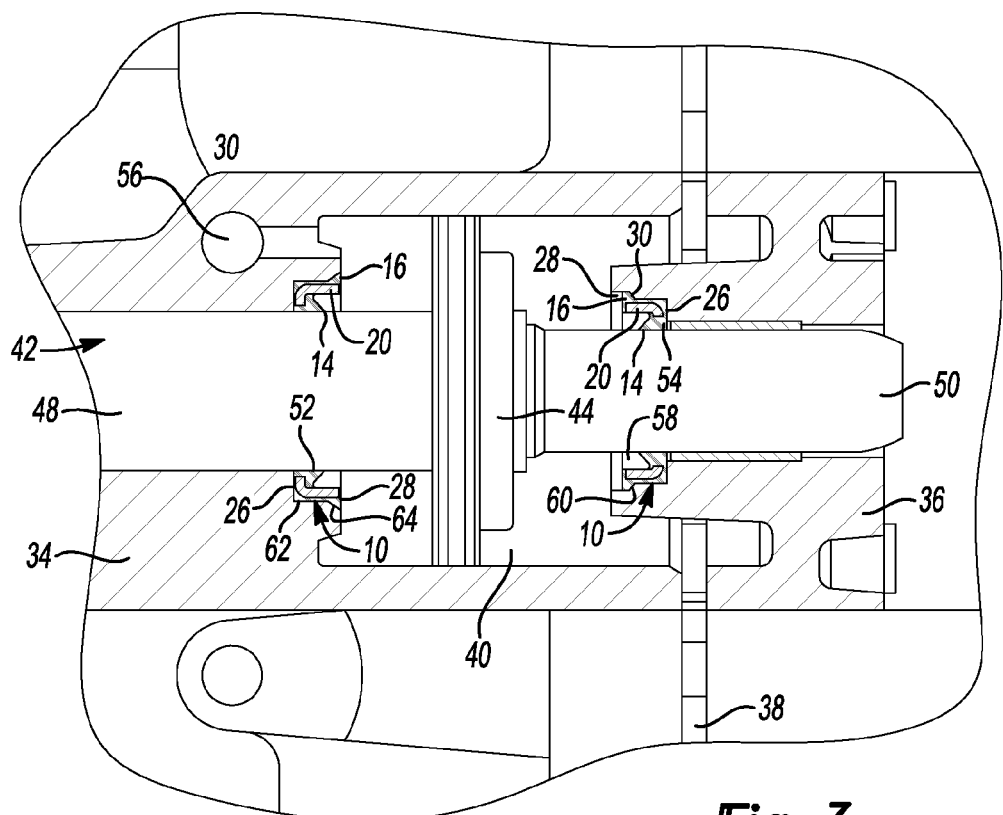
FIG. 3 is a fragmentary cross-section view of a manifold housing, clutch housing and a shift rail for a transmission shift apparatus.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a shift rail rod seal 10 is illustrated that is intended for use and in particular in a transmission shift apparatus. The shift rail rod seal 10 includes a seal body 12 that is an over-molded body portion of the seal 10. A seal lip 14 and chamfered lip 16 are over-molded with the seal body 12 onto a case 20, as shown in FIG. 2.

Referring to FIG. 2, the shift rail rod seal 10 is generally indicated and includes a seal body 12 that is over-molded onto the case 20. The seal body 12 includes the seal lip 14 and the chamfered lip 16. The seal lip 14 is provided to seal against a reciprocating rail or rod within the transmission shift or mechanism. The chamfered lip 16 is provided to prevent improper installation of the shift rail rod seal 10 in a transmission shift apparatus.

With continued reference to FIG. 2, the case 20 includes a cylindrical wall 22 and a rim 24 at one axial end of the case 20.

The seal body 12 includes a seat 26 that is received within an opening in the shift apparatus. The seal body 12 also includes a cavity side face 28 that faces the seal cavity that is pressurized with hydraulic fluid and used to shift a shift piston, as will be described with reference to FIGS. 3 and 4 below.

The chamfered lip 16 includes a beveled surface 30 that extends at approximately a 45° angle relative to the cylindrical wall 22 of the case 20. An outer peripheral portion 32 is located at the terminal end, or radially outboard end, of the beveled surface 30. The outer peripheral portion 32 may be a short cylindrical section or rounded area that provides a transition between the beveled surface 30 and the cavity side face 28.

Referring to FIG. 3, a transmission shift apparatus is shown in part to include a manifold housing 34 that is attached to a clutch housing 36. A transmission shift apparatus may include a plurality of shift rails that would also be sealed in accordance with the seals of this disclosure. A gasket plate 38 is provided between the manifold housing 34 and the clutch housing 36. A sealed cavity 40 is defined when the manifold housing 34 is attached to the clutch housing 36 and gasket plate 38. The sealed cavity 40 is a cavity that is supplied with hydraulic fluid under pressure. The hydraulic fluid is used to move a shift rail 42 by applying hydraulic pressure to one side or the other side of a shift piston 44. The shift rail 42 includes a manifold portion 48 and a clutch housing portion 50. The manifold portion 48 is received in the manifold housing 34 and is larger in diameter than the clutch housing portion 50. The clutch housing portion 50 of the shift rail 42 is received in the clutch housing 36 and has a smaller diameter than the manifold portion 48.

Figure 4:
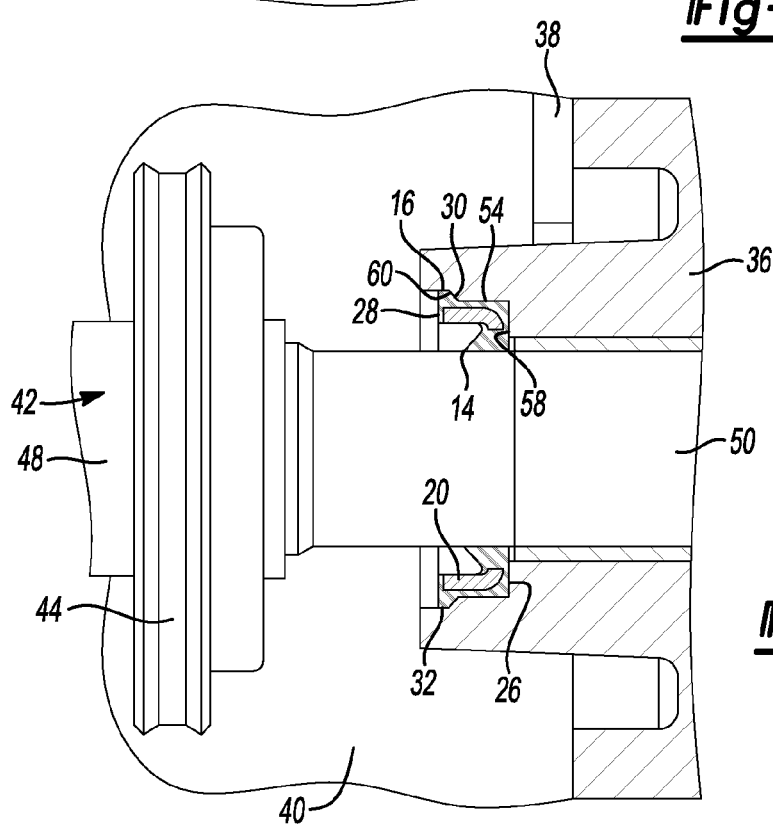
FIG. 4 is an enlarged fragmentary cross-section view showing the shift rail and clutch housing portion of FIG. 3.

As shown in FIGS. 3 and 4, the shift rail rod seal 10 is shown engaging the manifold portion 48 and the clutch housing portion 50. The rod seal 10 on the manifold side is referred to as the manifold side shift rod seal 52. The shift rail rod seal 10 that is assembled to the clutch housing 36 may be referred to as the clutch side shift rod seal 54.

A fluid port 56 is shown in the manifold housing 34. A similar fluid port 56 is also provided in the clutch housing 36, but is not illustrated in FIG. 3 or 4. Fluid is ported through the fluid port 56 and the fluid port (not shown) in the clutch housing 36 to shift the shift piston 44 and shift rail 42 within the sealed cavity 40.

Referring to FIG. 4, the clutch side shift rod seal 54 is received in a seal bore 58 that is defined in the clutch housing 36. The seal bore 58 includes a chamfered bore entrance 60 that is configured to receive the chamfered lip 16 when the clutch side shift rod seal 54 is correctly assembled into the seal housing bore 58.

Referring back to FIG. 3, the manifold housing 34 is provided with a seal bore 62 that includes a chamfered bore entrance 64. When the manifold side shift rod seal 52 is properly inserted in the seal bore 62, the chamfered bore entrance 64 is engaged by the chamfered lip 16 of the manifold side shift rod seal 52.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rod seal assembled within a seal housing bore that has a chamfered bore entrance for receiving a shift rail of a transmission shift apparatus comprising:
   a rigid cylindrical case;
   a seal body disposed between the case and rod seal housing;
   a seal lip extending from the seal body and adapted to engage the shift rail; and
   a chamfered lip provided on the seal body that engages the chamfered bore entrance when the rod seal is correctly assembled into the seal housing bore.

2. The rod seal of claim 1 wherein the seal body, seal lip and chamfered lip are over-molded onto the case.

3. The rod seal of claim 1 wherein the chamfered lip includes a beveled portion that extends from the seal body to a cylindrical outer peripheral portion that has a larger diameter than the seal body.

4. The rod seal of claim 1 wherein the seal body encases an outer cylindrical surface of the case and an inner cylindrical surface of the case.

5. The rod seal of claim 1 wherein the seal housing bore has a radially extending seal seating surface inset from the chamfered bore entrance, wherein the seal body engages the seal seating surface when the chamfered lip engages the chamfered bore entrance.

6. A transmission shift apparatus comprising:
   a manifold housing;
   a clutch housing defining a sealed cavity in conjunction with the manifold housing, wherein at least one of the housings define a seal bore and a chamfered bore entrance;
   a rod extending through the manifold housing, the clutch housing and the sealed cavity; and
   a seal assembled within each of the seal bores and having a chamfered lip engaging the chamfered bore entrance and wherein the seal engages the rod.

7. The transmission shift apparatus of claim 6 wherein the seal further comprises a case, a seal body and a seal lip, and wherein the seal body and the chamfered lip are over-molded onto the case.

8. The transmission shift apparatus of claim 7 wherein the seal body encases an outer cylindrical surface of the case and an inner cylindrical surface of the case.

9. The transmission shift apparatus of claim 7 wherein the chamfered lip includes a beveled portion that extends from the seal body to a cylindrical outer peripheral portion that has a larger diameter than the seal body.

10. The transmission shift apparatus of claim 7 wherein the seal bore has a seal seating surface inset from the chamfered bore entrance, wherein the seal body engages the seal seating surface when the chamfered lip engages the chamfered bore entrance.

11. A transmission shift apparatus comprising:
   a manifold housing defining a manifold housing bore having a first cylindrical wall and a first chamfered wall;
   a clutch housing assembled to the manifold housing to define a sealed cavity, wherein the clutch housing defines a clutch housing bore having a second cylindrical wall and a second chamfered wall;
   a manifold housing seal having a first cylindrical outer surface and a first chamfered outer surface that are adapted to be received in the manifold housing bore;
   a clutch housing seal having a second cylindrical outer surface and a second chamfered outer surface that are adapted to be received in the clutch housing bore;
   a shift rail extending through the manifold housing, the clutch housing and the sealed cavity;
   a shift piston attached to the shift rail and disposed within the sealed cavity that is shifted by hydraulic pressure between the manifold housing seal and the clutch housing seal;
   a manifold rod seal disposed within the manifold housing bore with the first chamfered outer surface engaging the first chamfered wall; and
   a clutch rod seal disposed within the clutch housing bore with the second chamfered outer surface engaging the second chamfered wall.

12. The transmission shift apparatus of claim 11 wherein the manifold rod seal and the clutch rod seal each further comprise a seal body and a seal lip, and wherein each seal body and each chamfered lip are over-molded onto a seal case.

13. The transmission shift apparatus of claim 12 wherein each seal body encases an outer cylindrical surface of the case and an inner cylindrical surface of the case.

14. The transmission shift apparatus of claim 11 wherein each chamfered outer surface includes a beveled portion that extends from a cylindrical body portion to a cylindrical outer peripheral portion that has a larger diameter than the cylindrical body portion.

15. The transmission shift apparatus of claim 11 wherein the manifold housing bore has a first seal seating surface inset from the first chamfered wall, wherein the manifold housing seal engages the first seal seating surface when the first chamfered lip engages the first chamfered surface, and wherein the clutch housing bore has a second seal seating surface inset from the second chamfered wall, wherein the clutch housing seal engages the second seal seating surface when the second chamfered lip engages the second chamfered surface.

* * * * *